Dec. 25, 1923.
C. P. LANDRETH
1,478,714
LIQUID TREATING APPARATUS
Filed Aug. 7, 1922  3 Sheets-Sheet 1
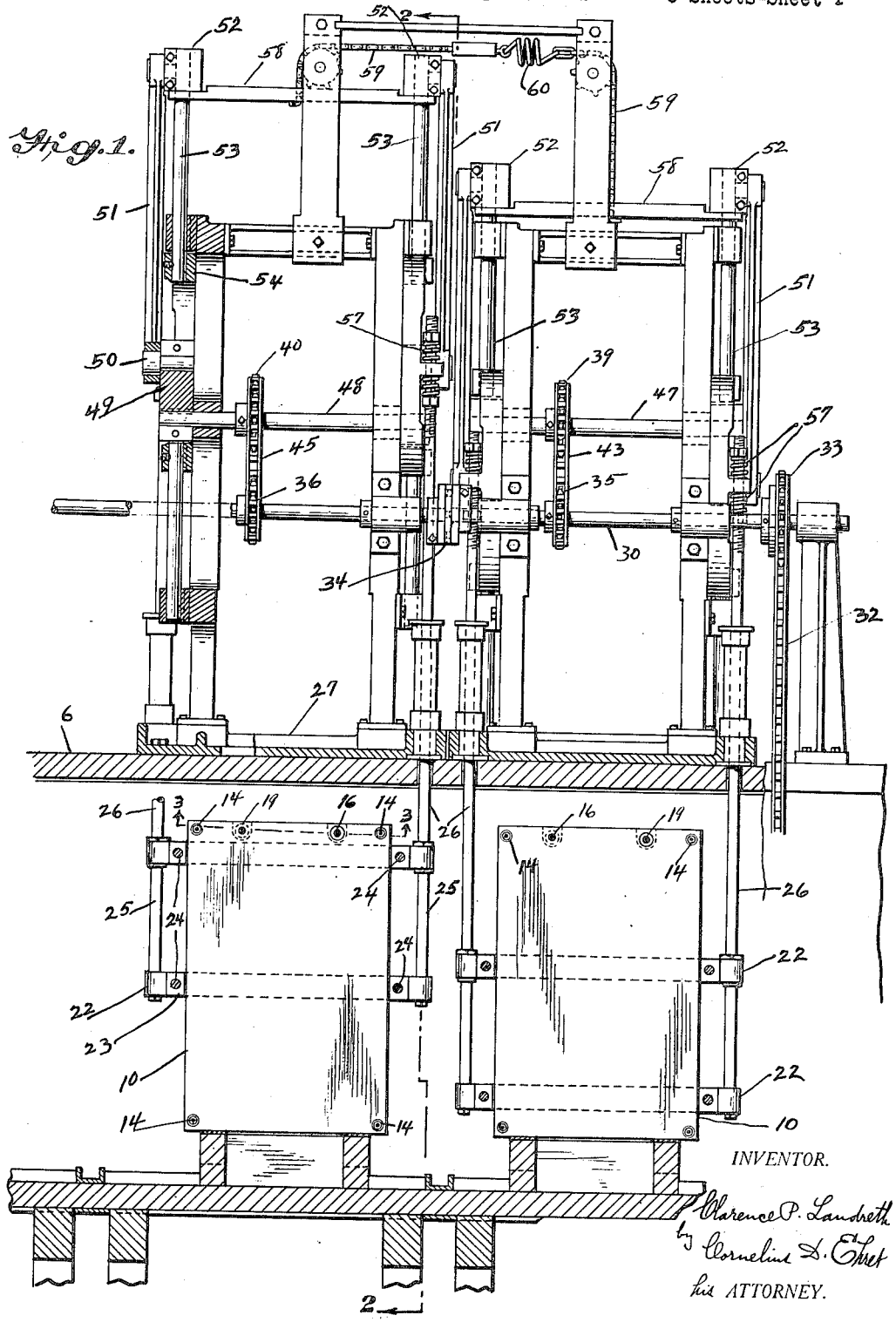

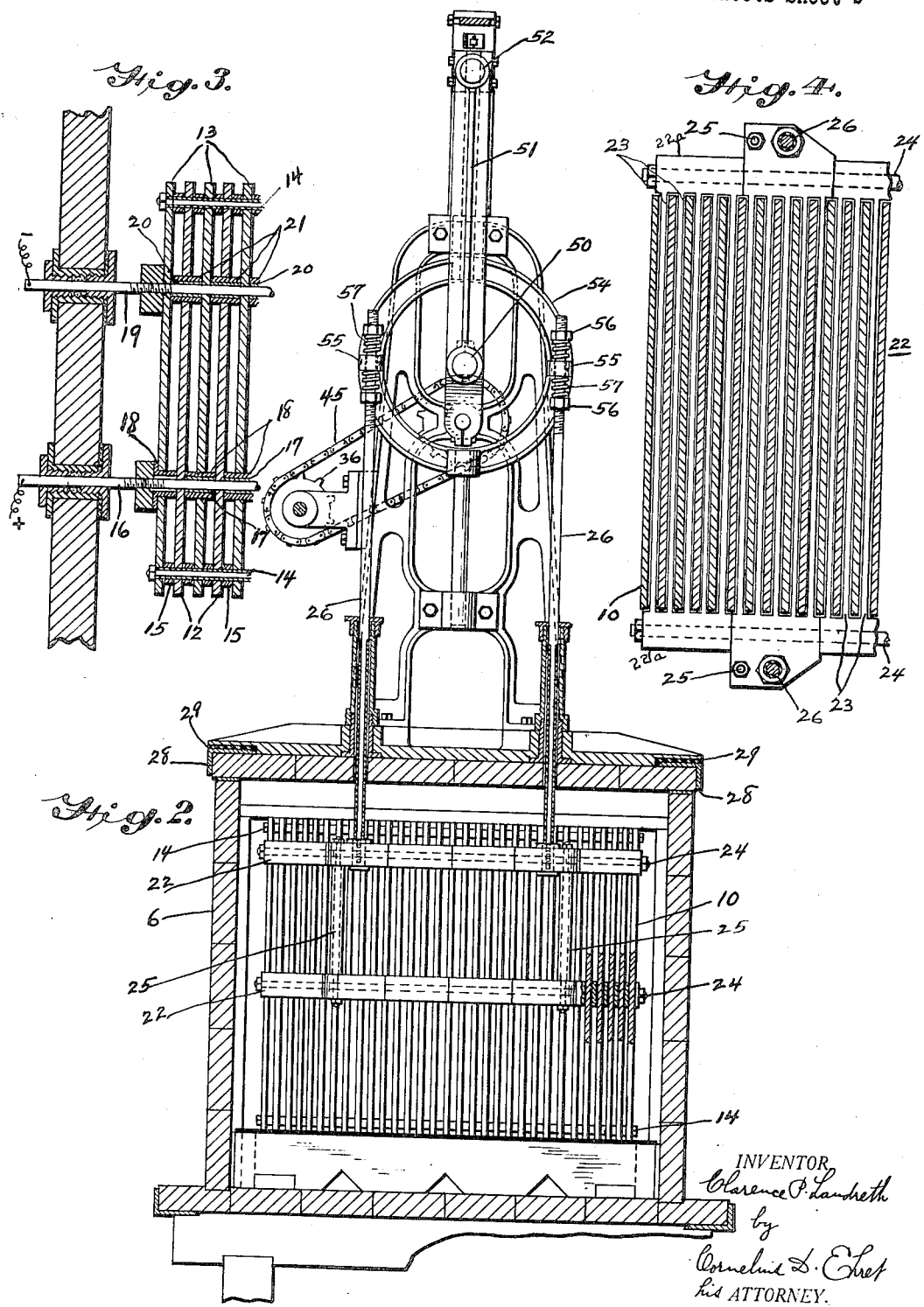

Dec. 25, 1923. 1,478,714
C. P. LANDRETH
LIQUID TREATING APPARATUS
Filed Aug. 7, 1922   3 Sheets-Sheet 3

INVENTOR.
Clarence P. Landreth
by Cornelius D. Ehret
his ATTORNEY.

Patented Dec. 25, 1923.

1,478,714

UNITED STATES PATENT OFFICE.

CLARENCE P. LANDRETH, OF PHILADELPHIA, PENNSYLVANIA.

LIQUID-TREATING APPARATUS.

Application filed August 7, 1922. Serial No. 579,998.

*To all whom it may concern:*

Be it known that I, CLARENCE P. LANDRETH, a citizen of the United States, residing in the city and county of Philadelphia, State of Pennsylvania, have invented certain new and useful Improvements in Liquid-Treating Apparatus, of which the following is a specification.

My invention relates to apparatus which is especially suitable for employment in connection with the treatment of liquids.

In Letters Patent No. 1,139,778, issued to me on May 18, 1915, is disclosed a process for the treatment of water, sewage, etc., and a form of mechanism which may be employed in carrying out the said process. The mechanism of the patent employs electrodes, between which the sewage to be treated flows, and is provided with paddles for agitating the sewage in order to prevent clogging between the electrodes or solids adhering thereto in excessive amounts, and to break up the solid matter contained in the sewage.

It is the object of the present invention to provide an improved form of mechanism for agitating the liquid, for preventing the accumulation of sediment on the electrodes, and for breaking up solids which may be present in the liquid being treated.

For an illustration of one of the various forms my invention may take, reference is to be had to the accompanying drawings, in which:

Fig. 1 is a view, partially in side elevation and partially in section, of one unit of an apparatus embodying my invention.

Fig. 2 is a view taken on the line 2—2 of Fig. 1.

Fig. 3 is a view taken on the line 3—3 of Fig. 1.

Fig. 4 is a bottom plan view of a portion of the apparatus of Fig. 2.

Figure 5:
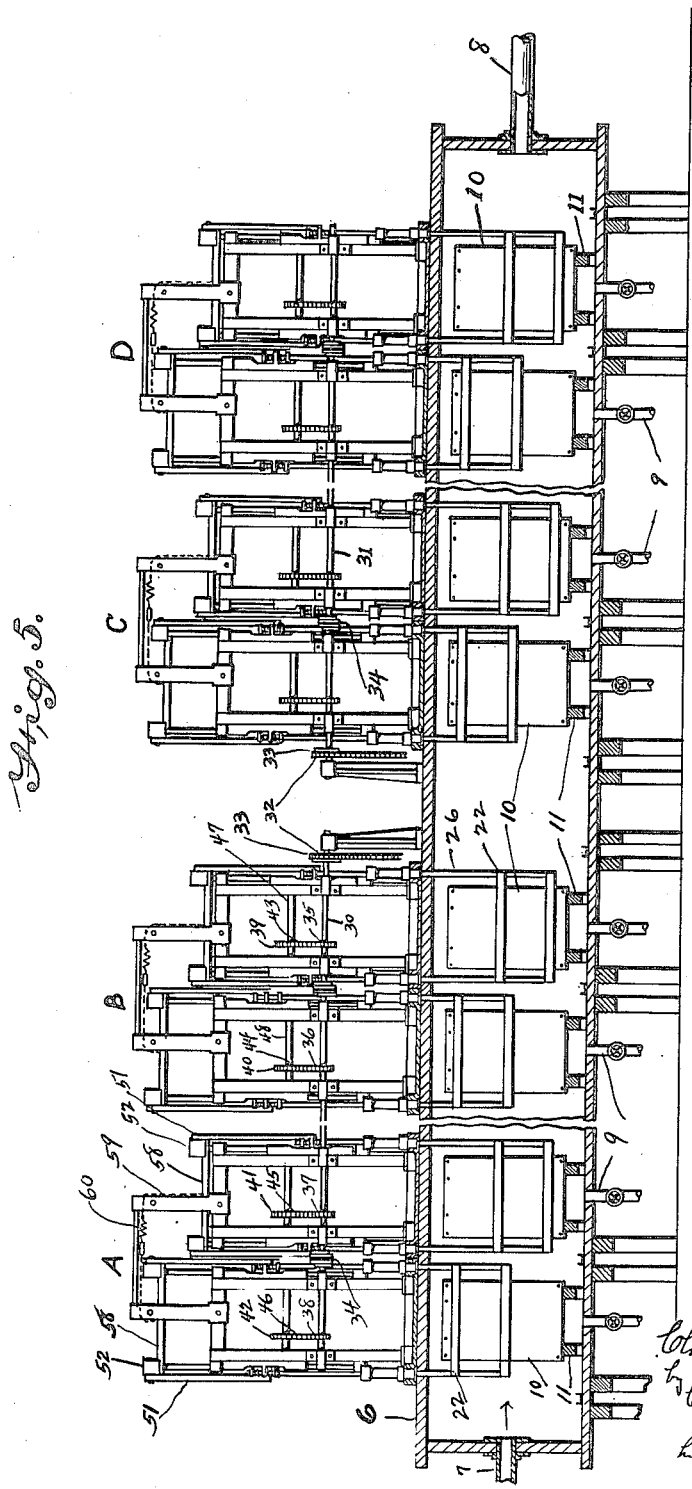
Fig. 5 is an assembly view showing a plurality of units such as shown in Fig. 1, mounted in co-operative relation.

Referring more particularly to Figs. 1 to 5, the device comprises a tank 6 provided with inlet and outlet openings 7 and 8, respectively, and with openings 9 in the bottom thereof for draining off the sludge which accumulates in the tank. Banks of electrodes 10, constructed somewhat after the manner of the electrodes of the patent above referred to, are supported in the tank 6 upon wooden bars 11, through which openings are provided, as shown in Fig. 5, for permitting free flow of the liquid therepast.

As shown more clearly in Fig. 3, the banks of electrodes 10 are divided into positive and negative, the positive electrodes being indicated by the numeral 12 and the negative electrodes by the numeral 13. The electrodes are held in assembled relation by tie rods 14, and are spaced apart by blocks 15, of insulating material.

The positive electrodes 12 are electrically connected to the conductor 16 by reason of their engagement therewith, as shown more clearly in Fig. 3, and through the brass sleeves 17 surrounding the conductor 16 and having their ends in engagement with the electrodes 12. Insulating sleeves 18 surround the brass sleeves 17 in order to insulate the electrodes 13 from the conductor 16.

A conductor 19 has electrical connection with the electrodes 13 by brass sleeves 20, and is insulated from the electrodes 12 by sleeves 21.

Current flowing through the conductor 16 will thus pass through the electrodes 12 and thence through the liquid which normally flows between the electrodes 12 and 13 to the electrodes 13 and the conductor 19.

In order to prevent solid matter which may be contained in the liquid being treated from accumulating upon the sides of the electrodes and clogging the spaces therebetween, I provide scrapers or agitators 22, which may be of molded insulating material, such as a phenolithic condensation product. These agitators comprise hollow end portions 22ª and bar-like members or strips 23 that are integral therewith and extend transversely of the electrodes, as indicated in dotted lines in Fig. 1, and as shown in bottom plan view in Fig. 4. The agitators employed in connection with each bank of electrodes are preferably made in sections, as shown in Fig. 2, the sections being held together by tie rods 24 that extend through the openings in the end portions 22ª. The agitators 22 are relatively narrow in order to reduce obstruction to the flow of liquid between the electrodes. In each bank of electrodes I provide two vertically spaced sets of agitators 22, which are maintained in their proper relative positions by means of rods 25. This arrangement lessens the length of vertical movement which would be necessary to clear the faces of the electrodes from foreign matter if only one set of agitators 22 were employed.

Lifting rods 26 are provided for each group of agitators 22, by means of which the agitators are reciprocated vertically in order to clear the electrodes of the foreign matter adhering thereto and to break up the solids which are contained in the body of liquid being treated. The mechanism for operating the rods 26 is mounted upon the cover of the tank 6 and comprises a framework 27. The framework 27 rests upon the angle irons 28 (Fig. 2), and is insulated therefrom by insulating material 29. Main drive shafts 30 and 31 are supported in the framework 27, and may be driven from a common source of power through chains 32 engaging the sprocket wheels 33. The shafts 30 and 31 are divided into longitudinal sections having rigid connection, but are insulated from each other by disk-like members 34, of insulating material.

The construction and operation of the apparatus associated with shaft 31 (Fig. 5) are the same as of the apparatus associated with the shaft 30, and therefore only the last named shaft and its operating mechanism will be described in detail.

The shaft 30 is provided with sprocket wheels 35, 36, 37 and 38, driving sprocket wheels 39, 40, 41 and 42, respectively, through chains 43, 44, 45 and 46, respectively. The sprockets 39 and 40 are respectively secured to shafts 47 and 48, each of which is provided with a pair of cranks 49, having crank pins 50 (Fig. 1). The cranks 49 on the shaft 48 are offset 180 degrees with respect to the cranks on the shaft 47. A crank arm 51 is provided at each end of each of the shafts 47 and 48, the lower end of each crank arm being supported by a crank pin 50, and the upper ends of each pair of crank arms being supported in bearing blocks 52 carried upon the upper ends of rods 53. As will be clear from Fig. 1, when one pair of bearing blocks 52 is in its uppermost position the other pair of blocks is in its lowermost position, by reason of the circumferentially offset relation of the cranks 49 above referred to.

The rods 53 at their lower ends support ring-like members 54, which operate in somewhat the same manner as cross heads. Each of the members 54 is provided with a pair of perforated lugs 55, through which the rods 26 extend, the rods being provided with spaced nuts 56 to hold cushioning or buffer springs 57 in place. The springs 57 serve to cushion the shocks incidental to the reciprocation of the rods 26 and the agitators carried thereby.

A bar 58 is provided at the upper end of each pair of rods 53, such bars being connected and held in position against the under side of the bearing blocks 52 by means of chains 59, which are joined by a spring 60, which is normally under slight tension.

As the shaft 30 is rotated, one of the groups of agitators 22 is raised as the other group is moving downwardly, as shown in Fig. 1. The weight of the downwardly moving group, by reason of the connection through the bars 58 and chains 59, assists in raising the other group. Furthermore, a more effective agitation of the liquid is secured than if the two groups of agitators occupied a common plane at all stages of their movements.

Each of the driving units A, B, C, D (Fig. 5) is identical in construction with the apparatus shown in detail in Fig. 1. It will be observed that when the left hand group of agitators 22 of unit A is in its uppermost position, the left hand group of agitators of unit B is also in its uppermost position, so that each group of agitators is in stepped relation with respect to the adjacent group or groups throughout substantially its entire cycle of movement. This arrangement affords a better mixing of the liquid.

The bars 58 have sliding engagement with the rods 53, and only sufficient power to overcome the frictional resistance of the moving parts, and the resistance offered by the liquid is required to operate the apparatus, because the weight of one group of agitators 22 will counterbalance the weight of its associated group. Furthermore, the apparatus is largely relieved of shocks from the driving mechanism at each change in direction of motion by reason of the spring 60. For example, with the parts in the position shown in Fig. 1, upward movement of the side rods 51 which are connected to the shaft 47 will not directly raise the group of agitators 22 which is connected thereto. These agitators are raised through the downward movement of the crank arms 51 which are connected to the shaft 48, the power being transmitted from the shaft 48 through the crank arms 51, bar 58, chains 59 and spring 60. The spring 60 will yield under this force and dampen the shock incident to the change in direction of motion of the reciprocating parts.

Various changes in detail and general arrangement may be made without departing from the spirit and scope of the invention as defined in the accompanying claims.

What I claim is:

1. A treating apparatus comprising a tank, a plurality of groups of electrodes mounted therein, a plurality of groups of agitating members respectively co-operating with the groups of electrodes, a driving unit mounted exteriorly of the tank, and connections between the said unit and agitators.

2. A treating apparatus comprising a tank, a plurality of groups of electrodes mounted therein, agitating members associated with said electrodes, a plurality of driving units located exteriorly of the tank, and connections between each of said units and certain of the agitating members whereby said members are moved in a predetermined relation.

3. A treating apparatus comprising a tank, a plurality of electrodes mounted therein, a plurality of groups of agitating members movable between the electrodes, a driving unit mounted exteriorly of the tank, and connections between the driving unit and the agitating members for imparting movement to adjacent groups of said members in opposite directions.

4. A treating apparatus comprising a tank, electrodes disposed within the tank, a plurality of groups of agitating members movable between the electrodes, driving mechanism for imparting reciprocatory movement to the agitating members, and driving connections of such form that when one group of agitating members is being advanced an adjacent group is being retracted.

5. A treating apparatus comprising a tank, electrodes disposed within the tank, a plurality of groups of agitating members, driving mechanism for imparting reciprocatory movement to the agitating members, and driving connections of such form that the groups of agitating members are moved in stepped relation.

6. A treating apparatus comprising a tank, a plurality of electrodes disposed vertically in the tank, agitating members movable vertically between the electrodes, and driving mechanism for the agitating members.

7. A treating apparatus comprising a plurality of vertically disposed electrodes, a plurality of groups of bars vertically reciprocable between the electrodes, and driving mechanism for the bars so arranged that one group of bars moves upwardly in advance of the upward movement of an adjacent group of bars.

8. A treating apparatus comprising a plurality of vertically disposed plates, four groups of bars disposed between the plates and divided into pairs, and means for imparting reciprocatory movement to the groups of bars which includes connections whereby upon upward movement of one group of each of said pairs the other group of such pair is caused to move downwardly.

9. A treating apparatus comprising a plurality of vertically disposed plates, four aligned groups of bars disposed between the plates and divided into pairs, and means for imparting reciprocatory movement to the groups of bars which includes connections whereby upon upward movement of one group of each of said pairs the other group of such pair is caused to move downwardly, the downwardly moving group of one pair being adjacent to the upwardly moving group of the other pair.

10. A liquid treating apparatus comprising a tank, groups of agitators disposed within the tank, a common driving shaft for the agitators, and a driving connection between the shaft and each of the groups of agitators, each driving connection being circumferentially offset with respect to another driving connection.

11. A liquid treating apparatus comprising a tank, groups of agitators disposed within the tank, a common driving shaft for the agitators, and a driving connection between the shaft and each of the groups of agitators, each driving connection being circumferentially offset with respect to an adjacent driving connection.

12. A liquid treating apparatus comprising a tank, two groups of agitators disposed within the tank, a driving shaft mounted exteriorly of the tank, a vertically reciprocable rod secured to each group of agitators and extending through the top of the tank, driving connections between the shaft and each of the rods, and a yielding connection between each of the rods which is independent of the driving connections.

13. A liquid treating apparatus comprising a tank, two groups of agitators disposed within the tank, a driving shaft mounted exteriorly of the tank, a vertically reciprocable rod secured to each group of agitators and extending through the top of the tank, loose driving connections between the shaft and each of the rods, each connection being offset circumferentially of the shaft with respect to the other connection, and a flexible connection between each of said rods for causing a downward movement of one group of agitators to exert an upward pull on the other of said groups.

14. A liquid treating apparatus comprising a tank, two groups of agitators disposed within the tank, a driving shaft mounted exteriorly of the tank, a vertically reciprocable rod secured to each group of agitators and extending through the top of the tank, driving connections between the shaft and each of the rods, and means independent of the driving connections for counterbalancing the two groups of agitators.

15. A liquid treating apparatus comprising a tank, two groups of agitators supported therein by vertically reciprocable rods, and a driving shaft provided with cranks having connection with said rods and offset circumferentially of the shaft.

16. A liquid treating apparatus comprising a tank, two groups of agitators supported therein by vertically reciprocable rods, a connection between said rods for effecting upward movement by one group of agitators upon downward movement of the other group, driving mechanism, and means operable when one group of agitators is in its uppermost position for effecting driving connection between said mechanism and the last mentioned agitators to cause downward movement of such agitators.

17. The combination with two vertically reciprocable members and driving mechanism therefor, of a connection between said members whereby the downward movement of one member causes upward movement of the other member, and lost motion connections between the driving mechanism and said members whereby said members are alternately engaged when in their upper positions to effect their downward movements.

18. The combination with two reciprocable members and driving mechanism therefor, of means for causing the advance movement of one of said members to effect a retractive movement of the other member, and means for effecting operative engagement between said driving mechanism and the member which is in advanced position.

19. A machine for treating liquids, comprising a tank, a plurality of groups of electrodes disposed within the tank, a plurality of groups of bars respectively associated with the groups of electrodes, in interspersed relation, and movable relatively thereto, mechanism for imparting reciprocatory movement to the bars, and driving connections whereby one group of bars is caused to advance as another group recedes.

20. A machine for treating liquids, provided with a plurality of groups of electrodes, a plurality of groups of agitating members respectively associated with the groups of electrodes, in interspersed relation, means for imparting relative movement between each group of electrodes and its associated group of agitating members, and connections whereby the relative movements in two of the pairs of associated groups are always in opposite directions.

21. A machine for treating liquids, provided with a plurality of groups of electrodes, a plurality of groups of bars respectively associated with the groups of electrodes, means for imparting relative vertically reciprocable movement to the bars with respect to the electrodes, and connections whereby upon upward movement of one group of members another group moves downwardly.

22. A machine for treating liquids, provided with a plurality of groups of electrodes, a plurality of groups of bars respectively associated with the groups of electrodes, means for imparting relative vertically reciprocable movement to the bars with respect to the electrodes, and connections whereby upon upward movement of one group of members another group moves downwardly, the weight of the downwardly moving members serving to assist in raising those moving upwardly.

23. A machine for treating liquids, provided with a group of electrodes mounted in spaced relation, a group of bars interspersed with the electrodes and movable as a unit, and means for moving the bars transversely of their longitudinal axes.

24. A machine for treating liquids, provided with a group of electrodes secured together in spaced relation adjacent their ends, a plurality of bars interspersed with the electrodes and extending transversely thereof, and means for imparting reciprocatory movement to the bars across substantially the entire surface of the plates.

25. A machine for treating liquids electrically, comprising a tank, electrodes disposed within the tank in spaced relation to each other, bars disposed between the electrodes, and means for reciprocating the bars in a direction parallel to the planes in which the electrodes are disposed and transversely of the longitudinal axis of the bars.

26. A machine for treating liquids, provided with a plurality of electrodes mounted in spaced relation, bars disposed between the electrodes, and means for reciprocating the bars.

27. A machine for treating liquids, provided with a plurality of electrodes mounted in spaced relation, bars disposed between the electrodes and extending transversely thereof to points beyond opposite edges of the electrodes, and means for imparting reciprocatory movement to the bars in a direction longitudinally of the electrodes.

28. Electrolytic treating apparatus comprising a container for liquid to be treated, a plurality of electrodes immersed in said liquid, an agitating member disposed adjacent an electrode, and means for imparting to said agitating member a movement of reciprocation substantially parallel to the surface of said electrode.

29. The combination with a liquid-treating device provided with a plurality of spaced electrodes, of an agitating device comprising an integral structure having bars disposed between said electrodes and a transverse end portion into which such bars merge, and means for imparting relative movement to the said agitating device and the electrodes.

30. The combination with a liquid-treating device provided with a plurality of spaced electrodes, of an agitating device comprising a plurality of integral structures each having bars disposed between the electrodes and a perforated end portion into which such bars merge, tie rods extending through said perforations to bind the said structures together, and means for imparting relative movement to the said device and electrodes.

31. The combination with a liquid-treating device provided with a plurality of spaced electrodes, of an agitating device comprising an integral structure having bars disposed between said electrodes and transverse end portions into which the ends of the bars merge, and means for imparting reciprocal movement to said device.

32. The combination with a liquid-treating device provided with a plurality of spaced electrodes, of an agitating device comprising a molded member having bars adapted to lie between the said electrodes and transversely disposed end portions into which the ends of the bars merge and by means of which they are supported.

33. The combination with a liquid-treating device provided with a plurality of spaced electrodes, of an agitating device comprising a plurality of molded members each having bars adapted to lie between the said electrodes and transversely disposed end portions into which the ends of the bars merge and by means of which they are supported, and means for securing the said molded members together as a unitary structure.

In testimony whereof I have hereunto affixed my signature this 5th day of August, 1922.

CLARENCE P. LANDRETH.